(12) United States Patent
Ach, III (10) Patent No.: US 6,996,444 B2
(45) Date of Patent: Feb. 7, 2006

(54) RATING METHOD, PROGRAM PRODUCT AND APPARATUS

(75) Inventor: Roger W. Ach, III, Cincinnati, OH (US)

(73) Assignee: Games, Inc., Cincinnati, OH (US)

( * ) Notice: Subject to any disclaimer, the term of this patent is extended or adjusted under 35 U.S.C. 154(b) by 600 days.

(21) Appl. No.: 09/834,529

(22) Filed: Apr. 13, 2001

(65) Prior Publication Data

US 2002/0173349 A1   Nov. 21, 2002

(51) Int. Cl.
A63F 13/00   (2006.01)

(52) U.S. Cl. .............................. 700/91; 763/25; 763/29

(58) Field of Classification Search .................... 463/1, 463/7–9, 25, 29, 42; 700/91–93; 705/14, 705/15

See application file for complete search history.

(56) References Cited

U.S. PATENT DOCUMENTS

| | | | | |
|---|---|---|---|---|
| 5,917,725 A | * | 6/1999 | Thacher et al. | 700/91 |
| 5,957,776 A | * | 9/1999 | Hoehne | 463/25 |
| 5,970,143 A | * | 10/1999 | Schneier et al. | 713/181 |
| 5,971,397 A | * | 10/1999 | Miguel et al. | 273/371 |
| 6,074,312 A | * | 6/2000 | Lyon et al. | 473/409 |
| 6,076,021 A | * | 6/2000 | Houriet et al. | 700/93 |
| 6,113,495 A | * | 9/2000 | Walker et al. | 463/42 |
| 6,149,519 A | * | 11/2000 | Osaki et al. | 463/1 |
| 6,224,486 B1 | * | 5/2001 | Walker et al. | 463/42 |
| 6,302,793 B1 | * | 10/2001 | Fertitta et al. | 463/25 |
| 6,321,128 B1 | * | 11/2001 | Costin et al. | 700/92 |
| 6,343,990 B1 | * | 2/2002 | Rasmussen et al. | 463/25 |
| 6,425,828 B2 | * | 7/2002 | Walker et al. | 463/42 |
| 6,511,377 B1 | * | 1/2003 | Weiss | 463/25 |
| 2002/0151359 A1 | * | 10/2002 | Rowe | 463/29 |
| 2002/0187834 A1 | * | 12/2002 | Rowe et al. | 463/42 |

* cited by examiner

Primary Examiner—John M. Hotaling, II
(74) Attorney, Agent, or Firm—Wood, Herron & Evans, LLP (57) ABSTRACT

The invention relates to a method of assessing the performance of a contest participant. Scores reflecting actions taken by the participant with regard to multiple games are manipulated to compute a rating.

83 Claims, 3 Drawing Sheets

RATING METHOD, PROGRAM PRODUCT AND APPARATUS

FIELD OF THE INVENTION

The present invention relates to a manner of assessing the performance of a participant within a contest environment.

BACKGROUND OF THE INVENTION

Industry has long recognized the economic potential associated with games and other contests. Sponsors and promoters routinely organize and produce contests in hopes of attracting ticket and product purchases, and in so doing, acquiring a profit in exchange for providing the entertainment or sport. The popularity and technological potential of electronic media such as the Internet now translate into even greater game diversity, sponsorship and accessibility.

The scope of proffered games is virtually limitless, ranging from simple chance, trivia, athletic, and role playing games to sophisticated computer-based games that feature lifelike sound and animation. Forums for such games vary accordingly, from fold-up card tables to convention halls, broadcast and Internet media.

Contests commonly reward participants based upon the level of skill demonstrated during a given contest. For instance, games typically challenge and recognize the speed, knowledge, accuracy or strategy of a contestant. Such recognition or rating of players provides a mechanism for motivating and rewarding skilled contestants, creating an incentive for participation.

Among such games, there exists a seemingly endless appetite for new contests, as well as for ways to make existing games more enticing. Further, the gaming industry strives in parallel to conceive concepts that will appeal to a broader spectrum of participants, drawing more players to sponsored gaming events.

SUMMARY OF THE INVENTION

The present invention provides method, apparatus and program product for assessing the performance of a contest participant. One embodiment rates performance based on generated scores that may reflect, among other actions taken by the participant, the diversity, endurance and skill level demonstrated in relation to a first and/or second game.

A ratings program resident on a Web server may evaluate participant performance based on scores. An associated network may support an environment comprising a plurality of games within which scores are generated, updated and displayed. A ratings program may process the scores to compute a rating. The network may ultimately compare ratings of participants to assess performance within the confines of the contest.

The above and other objects and advantages of the present invention shall be made apparent from the accompanying drawings and the description thereof.

BRIEF DESCRIPTION OF THE DRAWING

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF SPECIFIC EMBODIMENTS

One embodiment of the present invention relates a method of assessing the performance of a game participant. The embodiment rates performance based on generated scores that may reflect the diversity, endurance and skill level of the participant.

The scores may be generated, accumulated, updated and displayed within an environment comprising a plurality of games. The scores relate to particular aspects or categorizations of participant play with respect to the plurality of games. For instance, the scores may be indicative of the frequency or skill with which the participant executes a respective game within the plurality of games. Another action embodied in a score might reflect how many different games the participant attempts.

One embodiment manipulates and combines scores to arrive at a rating. The scores may be disproportionally scaled prior to the rating computation, according to contest specifications. One embodiment ultimately compares the rating of the participant to that of other players. Thus, the rating achieved by the participant determines their placement or assessment within the confines of the contest.

Figure 1:
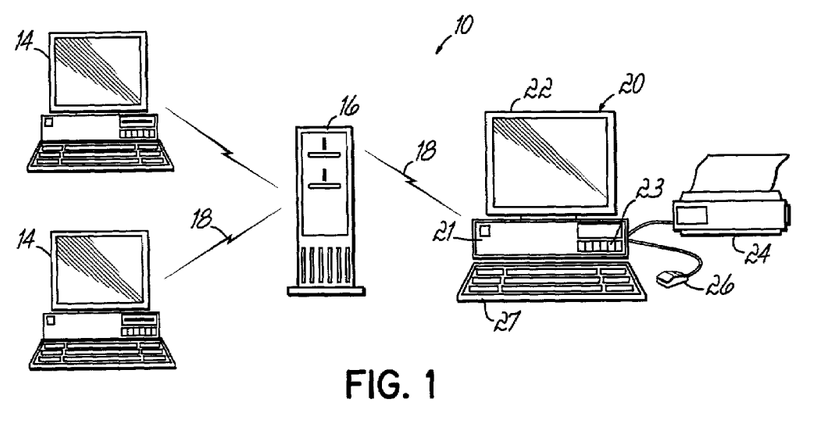
FIG. 1 is a block diagram of a networked computer system consistent with the invention.
Figure 2:
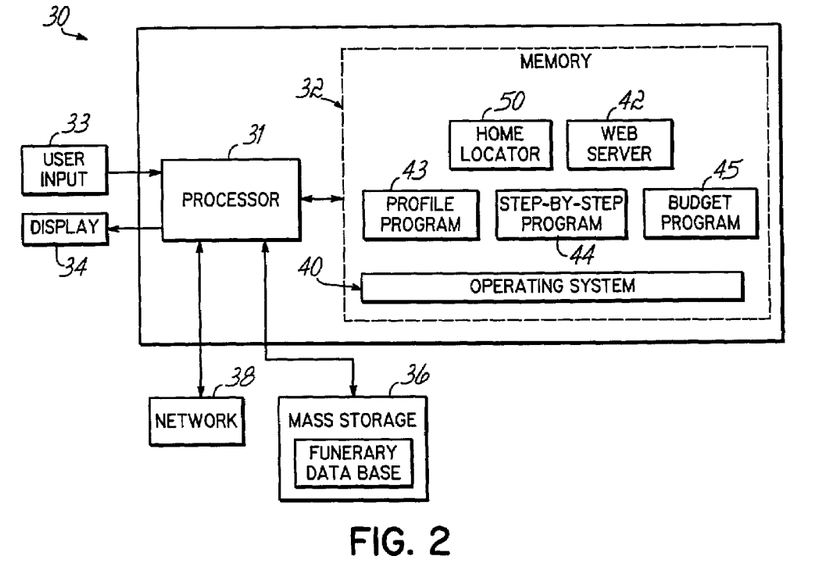
FIG. 2 is a block diagram of an exemplary hardware and software environment for a computer from the networked computer system of FIG. 1.

While the principles of this invention do not limit its forum or application, one desirable embodiment capitalizes on structure available through the computer networked systems exemplified in FIGS. 1 and 2.

Exemplary Hardware and Software Environment

Turning to the Drawings, wherein like numbers denote like parts throughout the several views, FIG. 1 illustrates a computer system 10 suitable for assessing the performance of a contest participant in a manner consistent with the invention. Computer system 10 is illustrated as a networked computer system including one or more client computers 12, 14 and 20 (e.g., desktop or PC-based computers, workstations, etc.) coupled to server 16 (e.g., a PC-based server, a minicomputer, a midrange computer, a mainframe computer, etc.) through a network 18.

Network 18 represents a networked interconnection, including, but not limited to local-area, wide-area, wireless, and public networks (e.g., the Internet). Moreover, any number of computers and other devices may be networked through network 18, e.g., multiple servers.

User computer 20, which may be similar to computers 12, 14, may include: a central processing unit (CPU) 21, a number of peripheral components such as a computer display 22, a storage device 23, a printer 24, and various input devices (e.g., a mouse 26 and keyboard 27), among others. Server computer 16 may be similarly configured, albeit typically with greater processing performance and storage capacity, as is well known in the art.

FIG. 2 illustrates a hardware and software environment for an apparatus 30 suitable for hosting an online contest assessment website consistent with the principles of the invention. For the purposes of the invention, apparatus 30 may represent a computer, computer system or other programmable electronic device, including: a client computer (e.g., similar to computers 12, 14 and 20 of FIG. 1), a server computer (e.g., similar to server 16 of FIG. 1), a portable computer, an embedded controller, etc. Apparatus 30 will hereinafter also be referred to as a "computer," although it should be appreciated the term "apparatus" may also include other suitable programmable electronic devices consistent with the invention.

Computer 30 typically includes at least one processor 31 coupled to a memory 32. Processor 31 may represent one or more processors (e.g., microprocessors), and memory 32 may represent the random access memory (RAM) devices comprising the main storage of computer 30, as well as any supplemental levels of memory, e.g., cache memories, non-volatile or backup memories (e.g., programmable or flash memories), read-only memories, etc.

In addition, memory 32 may be considered to include memory storage physically located elsewhere in computer 30, e.g., any cache memory in a processor 31, as well as any storage capacity used as a virtual memory, e.g., as stored within a database 36 or on another computer coupled to computer 30 via network 38.

Computer 30 also may receive a number of inputs and outputs for communicating information externally. For interface with a user, computer 30 typically includes one or more input devices 33 (e.g., a keyboard, a mouse, a trackball, a joystick, a touchpad, and/or a microphone, among others) and a display 34 (e.g., a CRT monitor, an LCD display panel, and/or a speaker, among others). It should be appreciated, however, that with some implementations of computer 30, e.g., some server implementations, direct user input and output may not be supported by the computer, and interface with the computer may be implemented through client computer or workstation networked with computer 30.

For additional storage, computer 30 may also include one or more mass storage devices 36 configured to store a database 37 containing ratings, as well as game and participant statistics. Exemplary devices 36 can include: a floppy or other removable disk drive, a hard disk drive, a direct access storage device (DASD), an optical drive (e.g., a CD drive, a DVD drive, etc.), and/or a tape drive, among others.

Furthermore, computer 30 may include an interface with one or more networks 38 (e.g., a LAN, a WAN, a wireless network, and/or the Internet, among others) to permit the communication of information with other computers coupled to the network. It should be appreciated that computer 30 typically includes suitable analog and/or digital interfaces between processor 31 and each of components 32, 33, 34, 36 and 38.

Computer 30 operates under the control of an operating system 40, and executes various computer software applications, components, programs, objects, modules, etc. (e.g., ratings program 44, web server 42, scaling algorithm 43, among others). Moreover, various applications, components, programs, objects, modules, etc. may also execute on one or more processors in another computer coupled to computer 30 via a network 38, e.g., in a distributed or client-server computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions will be referred to herein as "computer programs," or simply "programs." The computer programs typically comprise one or more instructions that are resident at various times in various computer memory and storage devices. When a program is read and executed by a processor, the program causes the computer to execute steps or elements embodying the various aspects of the invention.

Moreover, while the invention has and hereinafter will be described in the context of fully functioning computers and computer systems, those skilled in the art will appreciate that the various embodiments of the invention are capable of being distributed as a program product in a variety of forms. Further, the invention applies equally regardless of the particular type of signal bearing media used to actually carry out the distribution. Examples of signal bearing media include but are not limited to recordable type media such as volatile and non-volatile memory devices, floppy and other removable disks, hard disk drives, optical disks (e.g., CD-ROM's, DVD's, etc.), among others, and transmission type media such as digital and analog communication links.

In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Those skilled in the art will recognize that the exemplary environments illustrated in FIGS. 1 and 2 are not intended to limit the present invention. Indeed, those skilled in the art will recognize that other alternative hardware and/or software environments may be used without departing from the scope of the invention.

Ratings Program

Figure 3:
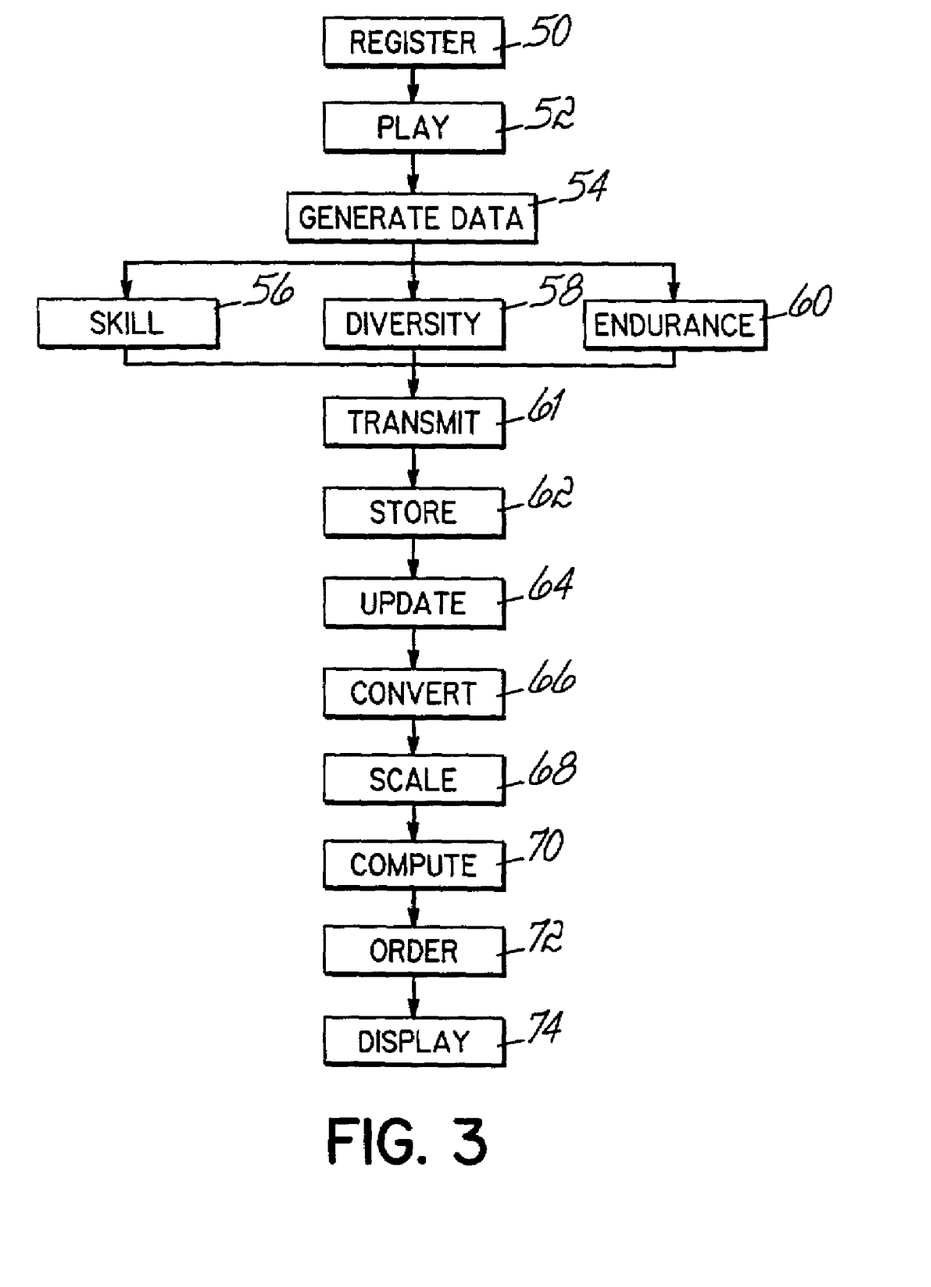
FIG. 3 is a flow chart illustrating one embodiment of a method of assessing the performance of a contest participant that is in accordance with the principles of the present invention.

The ratings program 44 of FIG. 2 manipulates recorded scores to assess the performance of a contest participant. The flowchart of FIG. 3 illustrates process steps associated with one embodiment of the program that are consistent with the invention.

An exemplary ratings program may prompt the participant to register at a central Web server at block 50. Registration may be universally free, or may have fees associated with it. Registration may require a participant to enter information, or may be accomplished automatically through a computer token, or "cookie," sent to the central server. Other known browser identification means are equally applicable.

A ratings program may assign an identification number to registered participants. The program may further allocate memory space at an associated database configured to store generated scores. The identification number can be used by the program to time-stamp game sessions, as well as to categorize scores prior to storage in the central database. The ratings program may additionally allocate storage space for the recording of personal participant information. Such information is not limited to hobbies, game preferences and general contact information.

The identification number may enable a participant access to different games and may be password protected. The identification number may further allow the participant to periodically track their own progress on a status website hosted by the central server, which displays updated scores, ratings and other statistics. Sponsors purchasing permissions to monitor or advertise during game sessions may use the identification number to match goods and services with participants meeting a product profile criterion.

Following registration at block 50, the player may proceed to participate in one or more of a plurality of games at block 52. The embodiment accommodates nearly any manner of game or contest hosted or designated by the central server. To function within the structure of one embodiment, a game must merely possess a certain, generic attribute from which a predetermined type of score can be generated.

Suitable games may merely feature some singular characteristic upon which some minimal, evaluative standard can be applied. For instance, games might qualify for inclusion in a contest based solely upon an attribute that lends itself to comparisons between participants, such as game points, duration, difficulty levels, timeliness, etc.

As may be appreciated, such generic mandates can apply to most any type of game, whether based in classic card, arcade, or board game principles. Suitable games also include athletic endeavors, trivia challenges and role-playing contests. Also, while a preferred embodiment realizes effects and other advantages affiliated with Internet and computer-related technologies, appropriate forums for games consistent with the invention are equally unbounded.

The games may be maintained by a common host or sponsor. As such, a central server may store and administer programs corresponding to the games. In such a scenario, the rating system can act as an incentive to encourage participants to play longer and to try other games posted by a sponsor.

Alternatively, the central server may host a link to an Internet site of the sponsor. Still another embodiment may assemble games based upon membership dues paid to the host, participant preference, or according to some common or complementary scheme. The program may also allow a participant to include games not specifically associated with the host website, but that nevertheless generate scores appropriate to a given contest.

As alluded to above, scores generated at block 54 can embody many different participant actions taken with respect to a game. A measurement of one such action, represented by block 56, reflects the success or skill demonstrated by a participant during a game session. As discussed below, the criteria used for evaluating skill levels may vary with respect to the character of each game.

A common measurement, such as the placement of a participant's final game score among those of other participants, may serve as a watermark for a skill measurement. However, another applicable action may pertain to the accumulation of incremental point totals or game scores. Game protocol may assign such points at specified instances within a game in response to participant accomplishments.

Measuring actions may further be knowledge-based, i.e., may reflect a participant's ability to answer a question pertaining to an aspect of a game. Other scores may be based on previously compiled statistics formatted to function as a baseline for comparison and measurement.

Of note, while some sophisticated computer games may present ample opportunity for the evaluation of skill and strategy, the skill score of other qualifying games may be satisfied by the mere entry of a participant. Such might be the case in a lottery-based game. As such, a participant may achieve a maximum score by merely submitting an entry, or through the action of presenting an answer to a trivia question.

Another score that may help establish a rating for a player concerns how many different games the participant attempts. At block 58, the ratings program may assign a score to a participant for demonstrated diversity, that is, for each contest played within the plurality of games.

As discussed below in greater detail, the program of the embodiment stores diversity scores within associated fields of the database at block 62. As such, the program may retrieve a score stored within the database diversity field in order for it to be manipulated and combined with other scores ultimately used to establish the rating.

Similarly, block 60 represents a step configured to glean another, exemplary score that can be used to establish a rating. Endurance comprises a measurement of how many games a participant played throughout the duration of a contest. For instance, the ratings program may tally the raw number of games played in a day, irrespective of repeated games.

One embodiment may stipulate that a participant complete a game in order to maximize an endurance score. Another contest may award endurance credit for completing an incremental portion of a game sequence. For instance, an exemplary computer game may credit a player with participation in the game after the player arrives at some intermediate point accumulation or program instance.

Scores relating to any of the above participant actions may be communicated to the central server at block 61. The transmission of the generated scores may be immediate, or may coincide with the conclusion of a contest, or some other predetermined occurrence, depending upon program and contest protocol. In a preferred embodiment, the central server receives scores on at least a daily basis.

To this end, a subroutine of the ratings program may retrieve scores from fields housed within the structure of a given game program. Conversely, the game program may be configured to generate and transmit a report that embodies pertinent scores. Scores reflecting participant actions may be automatically searched by the subroutine or forwarded to the appropriate database fields of the central server. In either instance, the ratings program is presented with the scores ultimately needed to compute the rating at block 70.

Should the games be resident on the central server, then the ratings program may easily retrieve or download the scores to the central database. Games maintained at a remote website, or games that are not conducive to a computer environment, may transmit the scores to the central server via voice, facsimile, electronic/conventional mail or any other known communication means.

The central server may store the scores in a database at block 62. The ratings program may periodically update the recorded scores at block 64 to reflect the most current game activity of a participant. The program may continue to update, store, and even post scores for participant review throughout the duration of a contest.

The server may compile and organize the scores in memory according to the identification number of the participant. The server may additionally record the scores according to the participant action it embodies. For instance, skill scores may be stored in a database field reserved exclusively for such data. Likewise, data tracking the diversity of a participant may be stored in a separate database field. Such exclusive structure may facilitate storage of newly generated scores, while further accommodating conversion 66, scaling 68 and computation 70 operations discussed below.

At block 66, the ratings program converts and formats the raw scores for further processing. For instance, in the case of a skill-related scores, the ratings program may assign points to a participant according to how many times they achieve one of the top ten game scores for a day. The chart below exemplifies a point allocation system consistent with such a embodiment:

| Place  | 1  | 2 | 3 | 4 | 5 | 6 | 7 | 8 | 9 | 10 |
|--------|----|---|---|---|---|---|---|---|---|----|
| Points | 10 | 9 | 8 | 7 | 6 | 5 | 4 | 3 | 2 | 1  |

By way of further example, the number of repeat game wins posted by a participant may constitute a measuring action in another given contest. As such, scores could testify as to the number of consecutive victories achieved by a participant in a rating contest. The rating program may assign a sliding-scale integer value to the identification number of the participant. The assigned integer embodies a score representative of the participant's repeat victories. Thus, the resultant, converted scores reflects a score indicative of a proscribed, participant act.

At block 68, the ratings program may scale the converted scores according to contest protocol. While skill, diversity and endurance data may all ultimately contribute to the rating of a participant, it may be desirable to disproportionately weight the emphasis placed on each score.

For example, one embodiment may call for ratings to reflect a statistical (two-to-one) preference for skill-based achievements. As such, the ratings program may mathematically manipulate the skill scores at block 68 so that the resultant number potentially accounts for half of the final rating. Scaling factors and other algorithms may likewise be applied to the diversity and endurance scores to scale them into values that each potentially comprise one quarter of the final rating.

Using the above scoring relationship, a skill rating of "6" (multiplied by fifty percent) will account for 3 rating points, while a diversity score of "4," and an endurance score of "6" (multiplied by twenty-five percent) will comprise 1.0 and 1.5 points, respectively. More involved computations may account for normal and standard deviations where appropriate. In this manner, steps associated with block 68 scale the data in accordance with contest scoring specifications.

The ratings program may sum the scaled scores at block 70. The resultant computation may comprise the rating for the participant. While one embodiment calls for a simple addition step at block 70, another may employ more sophisticated algorithms to achieve more subtle scoring effects.

At block 72, the ratings program may record the calculated rating and rank it in relation to the ratings of other participants. In another embodiment, the rating may be compared to a predetermined table of scores for purpose of assessing the relative performance of the participant.

One embodiment may initiate the display of information that relates to a rating at block 74. For instance, the rating of a participant may be posted as a percentile, or as a raw point total on a public or password-protected website. Other displays may include graphs or charts that reveal current leaders from among all participants based upon ratings.

Displays may be further customized to show only the rating of the participant and that of another, designated participant. Such postings can provide further incentive to participants eager to bolster their scores, as well as to those seeking encouragement regarding their current standing.

Figure 4:
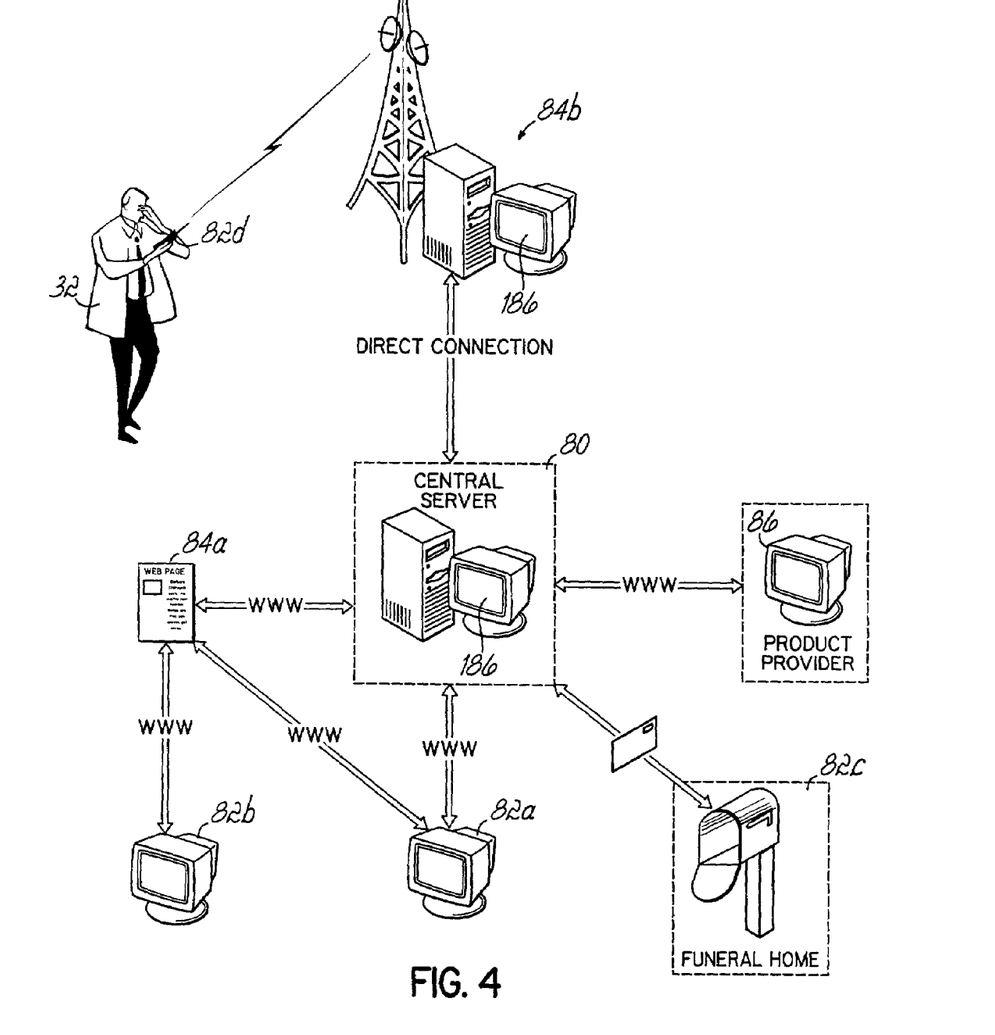
FIG. 4 is a schematic diagram that illustrates a communications network consistent with the principles of the present invention.

The exemplary communications network of FIG. 4 further demonstrates the broad application of principles presented in the flowchart of FIG. 3. Namely, a central Web server 80, associated database and a ratings program are electronically and logically connected to game participants 82a–d, sponsors 84a,b and a product vendor 86. In sum, the exemplary network provides an infrastructure for assessing the performance of a contest participant.

A ratings program resident on the central server 80 evaluates performance based on generated game scores. Such scores reflect participant actions that potentially reflect, among other characterizations, player diversity, endurance and skill level. The exemplary network supports an environment comprising multiple games within which the participant interacts and generates the scores.

Participants 82 and game sponsors 84 submit game scores and other information to the central database of the server 80 via Internet, telephone, computer and mail delivery mechanisms. The ratings program convert, proportion and otherwise process the scores to compute a rating. The network may ultimately compare ratings of participants to assess performance within the confines of the contest.

Referring more specifically to FIG. 4, a participant 82a accesses a central server 108 directly over the Internet, or via a website of a participating game host 84a. In the latter instance, a seamless link to the server 80 may allow scores to be transmitted, tallied and displayed without leaving the host website 84a. Alternatively, a game sponsor 84b may access the ratings website of the server 80 on behalf of the participant. As such, the sponsor 84b or other representative submits participant 82d scores according to contest parameters.

The interactive program of the central server 80 may allow participants 82 to choose from among several games appealing to varying levels of interest and skill. The server 80 may maintain and execute the game programs, itself, or it may provide links to remotely hosted/sponsored contests.

One embodiment may require the participant to register with the central server 80 before accessing the games. Exemplary registration submissions may include player contact, preference, password and/or payment information. Registration may be universally free, or have fees associated with different types of memberships.

After, or while playing a selected game, a ratings program executed on the central server 80 extracts scores relating to a designated game parameter. Alternatively, the game program may generate and communicate a data report or other transmission to the central server 80. Scores may be updated constantly at the central server 80. At the server 80, the ratings program may sum, replace, order or otherwise categorize newly submitted scores according to contest specifications.

A score typically reflects some action taken by the participant 82 with regard to a game or collection of games. For instance, one score might reflect how long a participant 82a remained logged-in to the game website. Another score might relate to achievements specific to two-player games, or to consecutive wins by the same participant. Still other score may embody the frequency with which a participant achieves a particular rating.

The character of other applicable scores may be dictated by the contest forum. For instance, a radio listener 82d may call in to a station 84b sponsoring a contest. The mere act of communication made by the participant 82d may satisfy a relevant requisite action, constituting a score. As illustrated in the exemplary network, the sponsor 84b may automatically or periodically transmit such scores to the central server 80 over a direct network connection.

Another game sponsor 84a within the embodiment may host games over their own server. Reporting dynamics between the sponsor 84a and central server 80 may operate as above, except now an Internet connection may provide the data link. The link may provide a seamless transition between the two servers, allowing the participant 82b access to ratings displays and other games offered via the central server 80. Of note, another sponsor or participant 82c may communicate scores and other results directly to the central server 80 using voice, facsimile or postal lines.

In any case, once the scores have been delivered, the ratings program incident on the central server 80 processes the scores according to the parameter specifications of the contest. For instance, the program may scale and combine a skill parameter score with a weighted endurance value. That resultant score may be further manipulated prior to being combined with a third score, such as one reflecting diversity.

Ultimately, the program of the embodiment arrives at a rating particular to the performance of the participant in the context of the predefined scores. The ratings program may rank the rating of the participant with respect to the ratings of other players processed at the central server 80.

Depending upon the access privileges granted to the participant 82a, the ratings program may initiate the display of the ratings on the central server 80, such that the ratings may be accessed from the terminal of the participant 82a. As alluded to above, the display format of the rating may vary according to player preference, marketing strategy and contest structure.

While the present invention has been illustrated by a description of various embodiments, and while these embodiments have been described in considerable detail, it is not the intention of the applicants to restrict or in any way limit the scope of the appended claims to such detail.

For instance, while diversity, skill and endurance scores, among others, have been addressed herein, another embodiment of the invention may employ virtually any measuring scheme conceivably suited to distinguish between participant performance, not limited to player age, zip code or game difficulty level.

Furthermore, while a computer-specific embodiment of the invention has been described above in detail, the embodiments of the invention have equal application in non-computer or computer-hybrid environments. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A method for assessing the performance of a contest participant, the method comprising:
   generating first scores reflective of action taken by each of a first plurality of participants in relation to a first type of game having a first set of rules;
   generating second scores reflective of action taken by each of a second plurality of participants in relation to a second type of game having a second set of rules; and
   calculating a rating by manipulating at least the first and second scores for a participant in both the first and second pluralities of participants.

2. The method according to claim 1, further comprising calculating the first score according to a frequency with which the participant plays the first game.

3. The method according to claim 1, further comprising calculating the first score according to a level of skill with which the participant plays the first game.

4. The method according to claim 1, further comprising calculating the first score according to a measurement of the success achieved by the participant with respect to a configured goal of the first game.

5. The method according to claim 1, further comprising calculating the first score according to a count of different games that the participant plays the first game.

6. The method of claim 1, further comprising calculating the rating according to how long the participant plays a game from among the first and second games.

7. The method of claim 1, further comprising calculating the first score according to how long the participant plays the first game.

8. The method according to claim 1, further comprising calculating the first score according to a count of consecutive actions identified according to the first set of rules as a win posted by the participant with respect to the first game.

9. The method according to claim 1, further comprising calculating the first score according to a count of consecutive actions identified according to the first set of rules as a win posted by the participant with respect to a ratings contest.

10. The method according to claim 1, further comprising communicating the first score to a contest host.

11. The method according to claim 1, further comprising generating a report containing the first score.

12. The method of claim 1, further comprising updating the rating based on a third score.

13. The method of claim 1, further comprising initiating registration of the participant within the contest.

14. The method of claim 1, further comprising recording multiple ratings.

15. The method of claim 14, further comprising displaying a name and the rating of the participant based on the multiple ratings.

16. The method of claim 1, further comprising displaying the rating in the form of a percentile of a maximum achievable rating or a percentile rank of the rating among those of other participants.

17. The method of claim 1, further comprising displaying the rating as a real number.

18. The method of claim 1, further comprising graphically displaying information pertaining to the rating.

19. The method of claim 1, further comprising recording information pertaining to the rating of a second participant.

20. The method of claim 19, further comprising displaying information pertinent to the rating of the participant in conjunction with the information pertaining to the rating of the second participant.

21. The method according to claim 19, further comprising ranking respective ratings as between the participant and the second participant.

22. The method of claim 19, further comprising recognizing a highest rating from among the participant and the second participant.

23. A computer-implemented method for assessing the performance of a computer contest participant, the method comprising:
   storing first scores reflective of action taken by each of a first plurality of participants in relation to a first type of game having a first set of rules;
   storing second scores reflective of action taken by each of a second plurality of participants in relation to a second type of game having a second set of rules; and
   calculating a rating by processing at least the first and the second scores for a participant in both the first and second pluralities of participants.

24. The method according to claim 23, further comprising computing the first score according to a frequency with which the participant plays the first game.

25. The method according to claim 23, further comprising computing the first score according to a level of skill with which the participant plays the first game.

26. The method according to claim 23, further comprising computing the first score according to a measurement of the success achieved by the participant with respect to a configured goal of the first game.

27. The method of claim 23, further comprising computing the first score according to how long the participant plays the first game.

28. The method according to claim 23, further comprising computing the first score according to a count of different games that the participant plays the first game.

29. The method of claim 23, further comprising computing the first score according to a total time that the participant plays either game among the first and second games.

30. The method of claim 23, further comprising hosting the first and second games on a website.

31. The method of claim 30, further comprising computing the first score according to a duration that the participant remains on the website.

32. The method according to claim 23, further comprising computing the first score according to a count of consecutive actions identified according to the first set of rules as a win posted by the participant.

33. The method according to claim 23, further comprising computing the first score according to a number of consecutive actions identified according to the first set of rules as a win posted by the participant with respect to a ratings contest.

34. The method according to claim 23, further comprising communicating the first score to a central server.

35. The method according to claim 23, further comprising generating an electronic report containing the first score.

36. The method of claim 23, further comprising updating the rating based on a third score.

37. The method of claim 23, further comprising initiating registration of the participant within the contest.

38. The method of claim 23, further comprising storing multiple ratings.

39. The method of claim 23, further comprising initiating a display of information relating to the rating.

40. The method of claim 39, further comprising initiating the display of the rating in the form of a percentile of a maximum achievable rating to a percentile rank of the rating among those of other participants.

41. The method of claim 39, further comprising initiating the display of the rating as a real number.

42. The method of claim 23, further comprising initiating a graphical display of information pertaining to the rating.

43. The method of claim 23, further comprising storing information pertaining to the rating of a second participant.

44. The method of claim 43, further comprising initiating a combined display of information pertinent to the rating of the participant in conjunction with information regarding the second participant.

45. The method according to claim 43, further comprising ranking respective ratings as between the participant and the second participant.

46. The method of claim 43, further comprising recognizing a highest rating from among the participant and the second participant.

47. An apparatus, comprising:
a memory;
a database resident in the memory, the database storing first scores reflective of action taken by each of a first plurality of participants in relation to a first type of game having a first set of rules, wherein the database further stores second scores reflective of action taken by each of a second plurality of participants in relation to a second type of game having a second set of rules, and
a program configured to compute a rating by processing at least the first and the second score for a participant in both the first and second pluralities of participants.

48. The apparatus of claim 47, wherein the program is configured to receive the first score.

49. The apparatus of claim 47, wherein the first score relates to a frequency with which the participant plays the first game.

50. The apparatus of claim 47, wherein the first score relates to a level of skill demonstrated by the participant with regard to the first game.

51. The apparatus of claim 47, wherein the first score relates to a measurement of success achieved by the participant with respect to a configured goal of the first game.

52. The apparatus of claim 47, wherein the program is configured to measure a period corresponding to the time the participant plays the first game.

53. The apparatus of claim 47, wherein the first score relates to a count of different games played by the participant.

54. The apparatus of claim 47, wherein the program is configured to measure a total time corresponding to the time the participant plays a game among the first and second games.

55. The apparatus of claim 47, wherein the program is configured to host the first game on a website.

56. The apparatus of claim 47, wherein the program is configured to measure a duration corresponding to how long the participant remains on the website.

57. The apparatus of claim 47, wherein the first score relates to a count of consecutive actions identified according to the first set of rules as a win posted by the participant with respect to the first game.

58. The apparatus of claim 47, wherein the first score relates to how many consecutive actions identified according to the first set of rules as a win posted by the participant with respect to a ratings contest.

59. The method according to claim 47, further comprising communicating the first score to the database.

60. The method according to claim 47, further comprising generating a report containing the first score.

61. The apparatus of claim 47, wherein the program is configured to update the rating based on a third score.

62. The apparatus of claim 47, wherein the program is configured to initiate registration of the participant within the contest.

63. The apparatus of claim 47, wherein the program is configured to initiate a display of information relating to the rating.

64. The apparatus of claim 63, wherein the program is configured to initiate the display of the rating in the form of a percentile of a maximum achievable rating or a percentile rank of the rating among those of other participants.

65. The apparatus of claim 63, wherein the program is configured to initiate the display of the rating as a real number.

66. The apparatus of claim 47, wherein the program is configured to initiate a graphical display of information pertaining to the rating.

67. The apparatus of claim 47, wherein the program is configured to store information pertaining to the rating of a second participant.

68. The apparatus of claim 67, wherein the program is configured to display information pertinent to the rating of the participant in conjunction with information regarding the second participant.

69. The apparatus of claim 67, wherein the program is configured to recognize a highest rating from among the participant and the second participant.

70. The apparatus of claim 67, wherein the program is configured to rank the respective ratings as between the participant and the second participant.

71. A computer program product on a computer readable medium, comprising:
   a program configured to perform a method of assessing the performance of a contest participant, the method comprising determining a rating based upon at least a first score and a second score, wherein the first score reflects a first action taken by the participant in relation to a first game having a first set of rules, wherein the second score reflects a second action taken by the participant in relation to a second game having a second set of rules, and wherein a first plurality of participants that includes the participant plays the first game and a second plurality of participants that also includes the participant plays the second game, and
   calculating a rating by manipulating at least the first and second, score for a participant in both the first and second pluralities of participants.

72. A method for assessing the performance of a contest participant, the method comprising:
   generating first scores reflective of action taken by each of a plurality of participants with respect to a first type of game having a first set of rules, wherein the first scores reflect at least one action selected from among the group, comprising: a frequency with which a participant of the first plurality plays the game, a level of skill with which the participant plays the game, a measurement of the success achieved by the participant with respect to a configured goal of the game, how long the participant plays the game, a count of consecutive actions identified according to the first set of rules as a win posted by the participant with respect to the game, and a count of consecutive wins posted by the participant with respect to a ratings contest;
   generating second scores reflective of action taken by each of a second plurality of participants in relation to a second type of game having a second set of rules, and
   calculating a rating by manipulating at least the first and the second scores for the participant in both the first and second pluralities of participants.

73. The method according to claim 72, further comprising communicating the first score to a contest host.

74. The method according to claim 72, further comprising generating a report containing the first score.

75. The method of claim 72, further comprising updating the rating based on a third score.

76. The method of claim 72, further comprising initiating registration of the participant within the contest.

77. The method of claim 72, further comprising displaying the rating in the form of a percentile of a maximum achievable rating or a percentile rank of the rating among those of other participants.

78. The method of claim 72, further comprising displaying the rating as a real number.

79. The method of claim 72, further comprising graphically displaying information pertaining to the rating.

80. The method of claim 72, further comprising recording information pertaining to the rating of a second participant.

81. The method of claim 80, further comprising displaying information pertinent to the rating of the participant in conjunction with the information pertaining to the rating of the second participant.

82. The method according to claim 80, further comprising ranking respective ratings as between the participant and the second participant.

83. The method of claim 80, further comprising recognizing a highest rating from among the participant and the second participant.

\* \* \* \* \*